United States Patent [19]
Watabe et al.

[11] Patent Number: 5,510,887
[45] Date of Patent: Apr. 23, 1996

[54] CLEANING BLADE, PROCESS CARTRIDGE CONTAINING SAME AND ELECTROPHOTOGRAPHIC APPARATUS USING SAME

[75] Inventors: Masahiro Watabe; Toshinari Miura, both of Yokohama, Japan

[73] Assignee: Canon Kabushiki Kaisha, Tokyo, Japan

[21] Appl. No.: 233,948

[22] Filed: Apr. 28, 1994

[30] Foreign Application Priority Data

Apr. 30, 1993 [JP] Japan ................... 5-124822

[51] Int. Cl.$^6$ ................................. G03G 21/00
[52] U.S. Cl. .................................... 355/299
[58] Field of Search ................... 355/299, 296; 15/236.01; 428/423.1

[56] References Cited

U.S. PATENT DOCUMENTS 5,080,976  1/1992  Yanai et al. ............ 355/299 X
5,145,724  9/1992  Yanai et al. ............ 355/299 X
5,157,098  10/1992 Lindblad et al. ........ 355/299 X
5,162,858  11/1992 Shoji et al. ............. 355/299
5,260,756  11/1993 Yanai et al. ............ 355/299

FOREIGN PATENT DOCUMENTS 0011719  1/1987  Japan .
0058280  2/1992  Japan .

*Primary Examiner*—Robert Beatty
*Attorney, Agent, or Firm*—Fitzpatrick, Cella, Harper & Scinto

[57] ABSTRACT

A cleaning blade is formed of a polyurethane elastomer obtained by using a hardener composition including at least trimethylolpropane. The polyurethane elastomer has the properties of (1) a trimethylolpropane concentration of at least 0.10 mM/g; (2) a urethane group concentration of at least 2.20 mM/g; and (3) a tanδ having a maximum value at a temperature of at most 12° C.

19 Claims, 3 Drawing Sheets

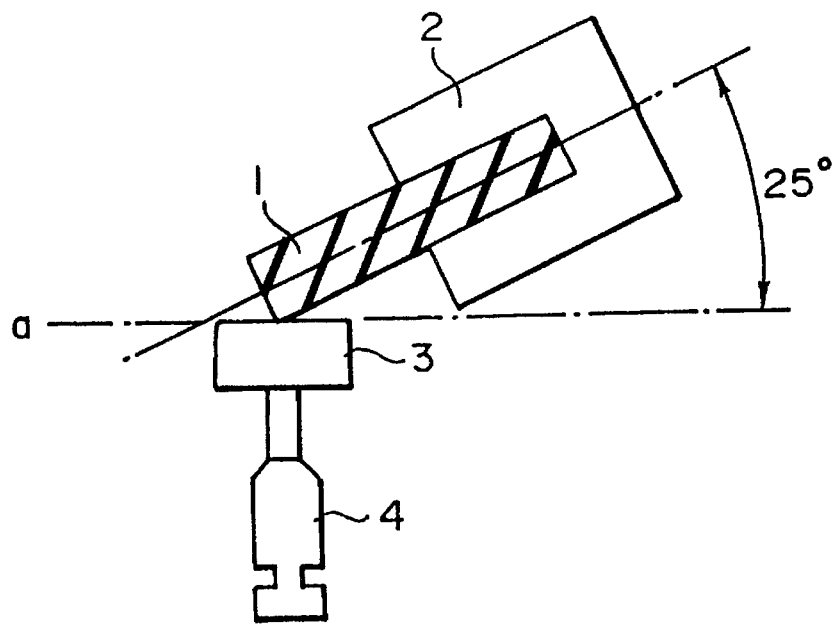
F I G. 1
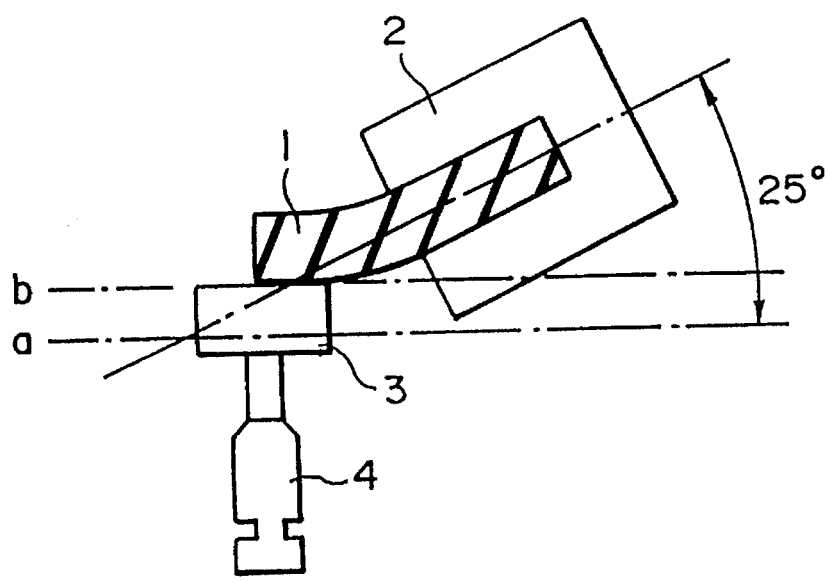
F I G. 2

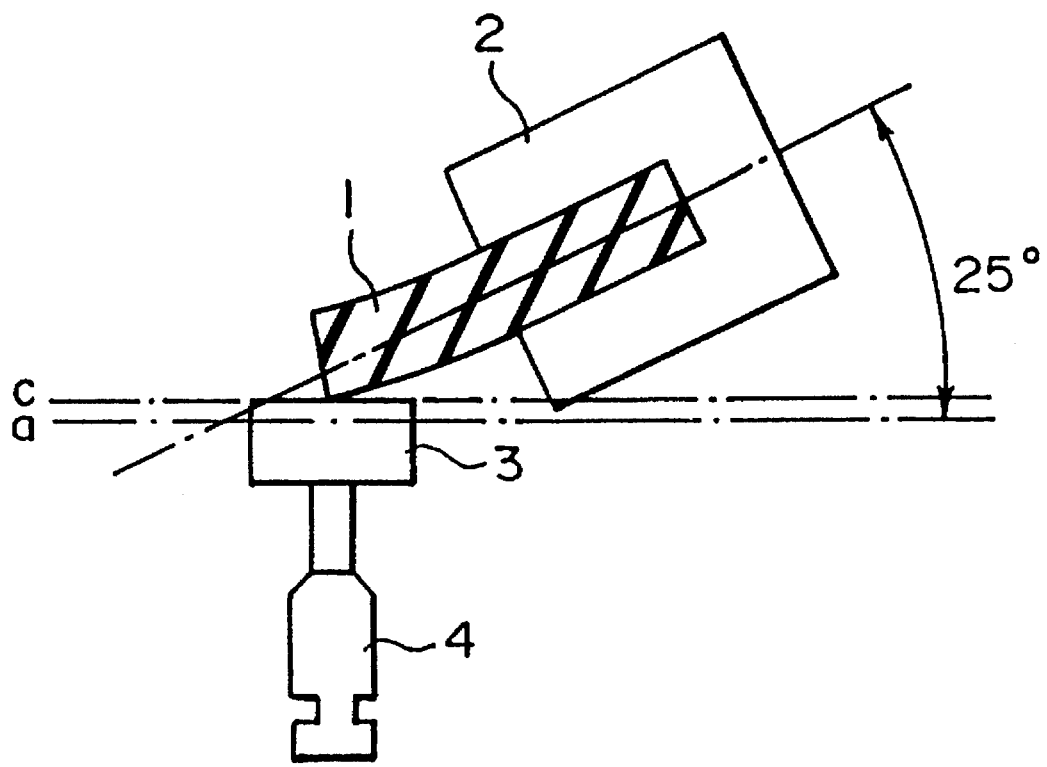
F I G. 3

CLEANING BLADE, PROCESS CARTRIDGE CONTAINING SAME AND ELECTROPHOTOGRAPHIC APPARATUS USING SAME

FIELD OF THE INVENTION AND RELATED ART

The present invention relates to a cleaning blade, particularly a cleaning blade for electrophotography, and also relates to a process cartridge containing the cleaning blade and an electrophotographic apparatus using the cleaning blade.

Electrophotographic copying machines and laser beam printers provide an image by utilizing electrophotography wherein an electrostatic latent image formed on a photosensitive drum is developed with a toner to form a toner image and then the toner image is transferred to a transfer material (e.g. paper) to fix the toner image thereon.

After a copying process, residual toner particles on the surface of the photosensitive drum are generally removed by means of a cleaner such as a cleaning blade.

In order to remove the residual toner particles, a cleaning blade has been used in such a state that the cleaning blade is kept in contact with the photosensitive drum under a prescribed pressure, thus leading to an occurrence of a creep phenomenon (i.e., deformation with time). As a result, the prescribed pressure has been gradually decreased to lower a toner-removing ability of the cleaning blade, thus adversely affecting a resultant toner image (e.g., image staining or image contamination).

The cleaning blade is generally abraded or broken at an end portion thereof by an abrasion or wearing between the cleaning blade and the photosensitive drum during a normal copying process and is decreased in an ability of removing residual toner particles on the surface of the photosensitive drum. As a result, an outputted image is stained with the residual toner particles. Accordingly, when the cleaning blade is used, the number of copying sheets is restricted due to the above-mentioned creep phenomenon. In addition, such a creep phenomenon is generated at the time of a pause in a copying process, so that the number of acceptable copying sheets after a long pause period of time is considerably decreased.

Heretofore, a cleaning blade has generally been composed of a polyurethane elastomer in view of its good abrasion resistance etc. However, such a cleaning blade has failed to satisfactorily suppress the creep phenomenon. There have been known cleaning blades comprising a polyurethane elastomer using a trifunctional alcohol such as trimethylolpropane (TMP) as a hardener (or curing agent) as disclosed in Japanese Laid-Open Patent Application (JP-A) No. 62-11719. Such cleaning blades have slightly improved in creep characteristics such as permanent deformation. However, there have been room for further improvements in creep characteristics, a cleaning function particularly at lower temperature, etc.

SUMMARY OF THE INVENTION

An object of the present invention is to provide a cleaning blade excellent in creep characteristics, abrasion resistance and durability and having a good cleaning function even at a lower temperature.

Another object of the present invention is to provide a process cartridge including the cleaning blade.

Still another object of the present invention is to provide an electrophotographic apparatus including the cleaning blade.

According to the present invention, there is provided a cleaning blade, comprising: a polyurethane elastomer obtained by using a hardener composition comprising at least trimethylolpropane, wherein said polyurethane elastomer has the following properties (1) to (3):

(1) a trimethylolpropane concentration of at least 0.10 mM/g;

(2) a urethane group concentration of at least 2.20 mM/g; and (3) a temperature giving a maximum of a tan$\delta$ of at most 12° C.

The present invention provides a cleaning blade described above for use in electrophotography.

The present invention also provides a process cartridge, comprising: at least the above-mentioned cleaning blade and an electrophotographic photosensitive member integrally supported to form a single cartridge which can be connected to or released from an apparatus body of an image-forming apparatus as desired.

The present invention further provides an electrophotographic apparatus comprising: an electrophotographic photosensitive member, means for forming an electrostatic latent image, means for developing the formed electrostatic latent image, means for transferring the developed image to a transfer-receiving material, and the above-mentioned cleaning blade.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1–3 are schematic views for illustrating a method for evaluating creep characteristics of a polyurethane elastomer wherein FIG. 1 shows a state of the polyurethane elastomer being in contact with a pressing plate; FIG. 2 shows a state of the polyurethane elastomer being pressed against the pressing plate; and FIG. 3 shows a state of the polyurethane elastomer being in contact with the pressing plate after the pressing operation shown in FIG. 2.

DETAILED DESCRIPTION OF THE INVENTION

Figure 4:
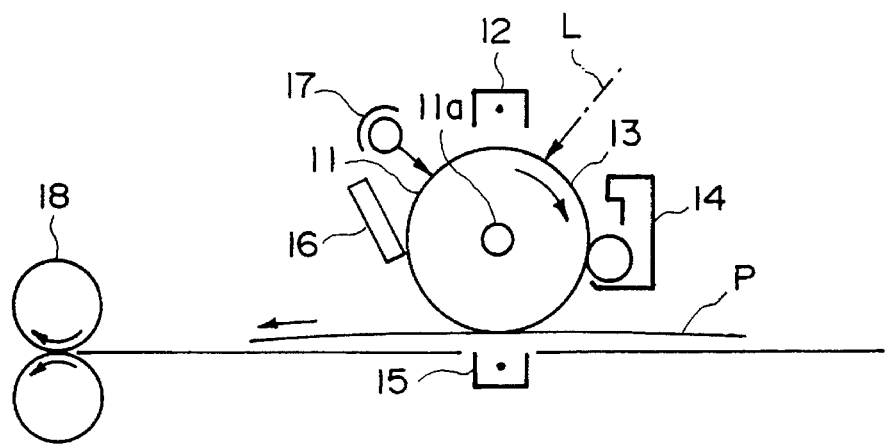
FIG. 4 is a schematic structural view of a transfer-type electrophotographic apparatus using the cleaning blade according to the present invention.

The cleaning blade according to the present invention is characterized by comprising a specific polyurethane elastomer having the following characteristic features (1)–(3):

(1) a trimethylolpropane (TMP) concentration of at least 0.10 mM/g, (2) a urethane group concentration of at least 2.20 mM/g, and (3) a temperature giving a maximum of a tan$\delta$ of at most 12° C.

The polyurethane elastomer used in the present invention has a TMP concentration of at least 0.10 mM/g, preferably 0.10–0.25 mM/g, more preferably 0.11–0.22 mM/g, thereby to improve creep characteristics, thus suppressing cleaning failure even after a long pause period of time. This may be attributable to a denser three-dimensional network structure of the polyurethane elastomer formed by increasing a concentration of trimethylolpropane capable of affording a crosslinked or branched structure, whereby a shape of the polyurethane elastomer is liable to be readily restored to an original shape thereof when the polyurethane elastomer is deformed by stress.

The polyurethane elastomer has an urethane group concentration of at least 2.20 mM/g, preferably 2.20–2.60 mM/g, more preferably 2.22–2.52 mM/g, thereby to show a durability of copying of at least 5000 sheets. This may be attributable to an abrasion resistance of the polyurethane elastomer improved by increasing a concentration of urethane groups having a function of aggregating polyurethane molecules to each other to form a hard segment of the polyurethane elastomer. In addition, by keeping the above-mentioned urethane group concentration, it is possible to compensate a decrease in hardness due to the increased TMP concentration.

In order to keep a cleaning function at a lower temperature, the polyurethane elastomer is required to have a sufficient rubber elasticity in a temperature range wherein a copying machine is generally used. Our research group has found that an elasticity sufficient for the lower temperature cleaning can be retained by providing a temperature giving a maximum of a $\tan\delta$, which is one of dynamic viscoelasticity characteristics, of at most 12° C., preferably 0°–12° C., more preferably 0.5°–11.6° C. Generally, a polyurethane elastomer is liable to be considerably increased in its hardness and to lose its elasticity at a temperature lower than a temperature giving a maximum of $\tan\delta$ thereof compared with the case of a temperature higher than the temperature giving a maximum of $\tan\delta$. As a result, the polyurethane elastomer loses an ability of removing residual toner particles on a photosensitive drum. Accordingly, it is possible to retain a cleaning function even under low-temperature condition by providing a temperature giving a maximum of $\tan\delta$ of at most 12° C.

In a preferred embodiment of the present invention, the polyurethane elastomer has characteristic features including a TMP concentration of at least 0.11 mM/g, a urethane group concentration of at least 0.22 mM/g, and a temperature giving a maximum of a $\tan\delta$ of at most 11.6° C.

Herein, a TMP concentration, a urethane group concentration and a temperature giving a maximum of a $\tan\delta$ are determined or measured in the following manner.

TMP concentration

A TMP concentration can be determined by dividing a weight (g) of a polyurethane elastomer into the number of mili-moles of trimethylolpropane (TMP). TMP has a molecular weight of 134.17 and accordingly a TMP concentration is obtained by the following equation.

TMP concentration (mM/g)=(a weight (g) of TMP/134.17)×1000/(a weight (g) of a prepolymer+a weight (g) of a diol (e.g., ethylene glycol, butylene glycol)+a weight (g) of TMP)

Urethane group concentration

In the case where the number of moles of an unreacted isocyanate group divided into the number of moles of total hydroxyl groups within a hardener is not more than 1, the number of urethane groups formed within a polyurethane elastomer equals to the number of hydroxyl group (—OH) which have been contained in a polyester diol and a hardener composition consisting of a diol (e.g., 1,4-butylene glycol) and trimethylolpropane. Urethane group concentration can be obtained by dividing the number of milimoles of the urethane groups within the polyurethane elastomer by a weight (g) of the polyurethane elastomer as follows.

Urethane group concentration (mM/g)=(the number of moles of —OH within a polyester diol+the number of moles of —OH within a diol+the number of moles of —OH within TMP)×1000/(a weight (g) of the polyester diol+a weight (g) of a diisocyanate (e.g., diphenylmethane-4,4'-diisocyanate)+a weight (g) of the diol+a weight (g) of TMP)

In the above equation, each of the numbers of moles of —OH of the above three substances is obtained by the following equations.

Number of moles of —OH within polyester diol (M/g)=(a weight (g) of polyester diol×a hydroxyl value (mgKOH/g) of polyester diol)/(a molecular weight of polyester diol; e.g., 1000 for a polyester diol used in Example 1 appearing hereinafter)×56.11 (i.e., formula weight of KOH).

Number of moles of —OH within diol (M/g)=2×(a weight (g) of diol)/(a molecular weight of diol; e.g., 90.12 for 1,4-butanediol)

Number of moles of —OH within TMP=3×(a weight (g) of TMP)/(134.17 (i.e., a molecular weight of TMP)

Temperature giving a maximum of $\tan\delta$

A temperature giving a peak of $\tan\delta$ can be measured by dynamic viscoelasticity measuring apparatus ("RSA II", manufactured by Rheometrics Far East Co.; soft: Rhios).

More specifically, a test piece (section of 1.5 mm×6 mm, length of 22.5 mm) of a polyurethane elastomer was prepared and fixed to the measuring apparatus at two positions each being 6 mm distant from the end of the test piece. Then, a prescribed tension due to a prescribed load (200 g) was exerted on the test piece, and the test piece was distorted under a frequency of 10 Hz. The resultant stress was measured and resolved into its components comprising an elastic stress and a viscous stress from which a storage elastic modulus (E') and a loss elastic modulus (E") were obtained. A value of a loss tangent ($\tan\delta$) was obtained by dividing E" by E' (i.e., E"/E') at a prescribed temperature. The above measurement was performed from a lower temperature side to a higher temperature side while increasing a temperature at a rate of 0.1° C./minutes from the lower temperature side, whereby a temperature giving a maximum of a loss tangent ($\tan\delta$) was obtained (herein, such a temperature is sometimes referred to as "$\tan\delta$ peak temperature"). Incidentally, the test piece of the polyurethane elastomer was distorted by exerting thereon a further tension due to a further load of ±a (g) in addition to the prescribed tension due to the prescribed load of 200 (g) under a frequency of 10 Hz. A value of a is changed depending upon a measurement temperature and is set in accordance with an auto-strain mode.

The polyurethane elastomer used for constituting the cleaning blade according to the present invention can be prepared in various manners widely known in the art of polyurethane synthesis. For example, the polyurethane elastomer used in the present invention can be produced by reacting a prepolymer with a hardener composition comprising at least trimethylolpropane (TMP). The prepolymer may preferably be a polyester-based prepolymer obtained by reacting a polyester diol, obtained from a dicarboxylic acid and a diol, with a diisocynate. Examples of the dicarboxylic acid may include: saturated or unsaturated dibasic acids such as adipic acid, sebacic acid, terephthalic acid, isophthalic acid, maleic acid and fumaric acid; acid anhydrides such as maleic anhydride and phthalic anhydride; dialkyl esters such as dimethyl terephthalate.

Examples of the diol may include glycols such as ethylene glycol, butylene glycol, propylene glycol, diethylene glycol, dipropylene glycol, neopentyl glycol and 1,6-hexylene glycol.

Examples of the diisocyanate may include diphenylmethane-4,4'-diisocyanate (MDI), hexamethylene diisocyanate (HMDI), isophorone diisocyanate, dicyclohexylmethane-4,4'-diisocyanate, 2,4-tolylene diisocyanate (2,4-TDI), 2,6-tolylene diisocyanate (2,6-TDI), carbodiimide-modified MDI, polymethylene polyphenylisocyanate (PAPI), ortho-toluidine diisocyanate (TODI), naphthylene diisocyanate (NDI), and xylylene diisocyanate (XDI).

The polyester diol used in the present invention may have a molecular weight of 750–3000, preferably 1000–2000. This molecular weight is obtained from the following equation:

Molecular weight of polyester diol=1000×2×56.11 (formula weight of KOH)/hydroxyl value of polyester diol (mgKOH/g).

The hardener composition used in the present invention comprises TMP and at least one another hardener. Examples of another hardener may include 1,4-butylene glycol, ethylene glycol, diethylene glycol, propylene glycol, dipropylene glycol, hexanediol, glycerin, pentaerythritol, sorbitol, 1,4-cyclohexanediol, 1,4-cyclohexanedimethanol, and xylylene glycol.

The polyurethane elastomer used in the present invention may preferably be produced by reacting a prepolymer, which is obtained by reacting diphenylmethane-4,4'-diisocyanate (MDI) with a polyester diol obtained from adipic acid and either one or both of ethylene glycol and butylene glycol, with a hardener composition comprising trimethylolpropane (TMP) and 1,4-butylene glycol (1,4-BG).

FIG. 4 shows a schematic structural view of an electrophotographic apparatus, which is one of image-forming apparatus, using a cleaning blade of the invention. Examples of the electrophotographic apparatus may include a copying machine and a laser beam printer. Referring to FIG. 4, a photosensitive drum (i.e., photosensitive member) 11 as an image-carrying member is rotated about an axis 11a at a prescribed peripheral speed in the direction of the arrow shown inside of the photosensitive drum 11. The surface of the photosensitive drum is uniformly charged by means of a charger 12 to have a prescribed positive or negative potential. At an exposure part 13, the photosensitive drum 11 is exposed to light L (as by slit exposure or laser beam-scanning exposure) by using an image exposure means (not shown), whereby an electrostatic latent image corresponding to an exposure image is successively formed on the surface of the photosensitive drum 11. The electrostatic latent image is developed by a developing means 14 to form a toner image. The toner image is successively transferred to a transfer-receiving material P (e.g., paper) which is supplied from a supply part (not shown) to a position between the photosensitive drum 11 and a transfer charger 15 in synchronism with the rotating speed of the photosensitive drum 11, by means of the transfer charger 15. The transfer-receiving material P with the toner image thereon is separated from the photosensitive drum 11 to be conveyed to a fixing device 18, followed by image fixing to print out the transfer-receiving material P as a copy outside the electrophotographic apparatus. Residual toner particles on the surface of the photosensitive drum 11 after the transfer are removed by means of a cleaner 16 (i.e., a cleaning blade) to provide a cleaned surface, and residual charge on the surface of the photosensitive drum 11 is erased by a pre-exposure means 17 to prepare for the next cycle. As the charger 12 for charging the photosensitive drum 11 uniformly, a corona charger is widely used in general. As the transfer charger 15, such a corona charger is also widely used in general.

According to the present invention, in the electrophotographic apparatus, it is possible to provide a process cartridge which includes plural means inclusive of or selected from the photosensitive member 11 (photosensitive drum), the charger 12, the developing means 14, the cleaning blade 16, etc. so as to be attached or removed as desired. The process cartridge may, for example, be composed of the photosensitive member and at least one device of the charger, the developing means and the cleaning blade integrally supported to comprises a single cartridge capable of being attached (or connected) to or removed (or released) from the body of the electrophotographic apparatus by using a guiding means such as a rail in the body.

In a case where the electrophotographic apparatus is used as a copying machine or a printer, light-image exposure L may be effected by using reflection light or transmitted light from an original, or by reading data on the original by a sensor, converting the data into a signal and then effecting a laser beam scanning, or drive of LED array or drive of a liquid crystal shutter array in accordance with the signal.

Figure 5:
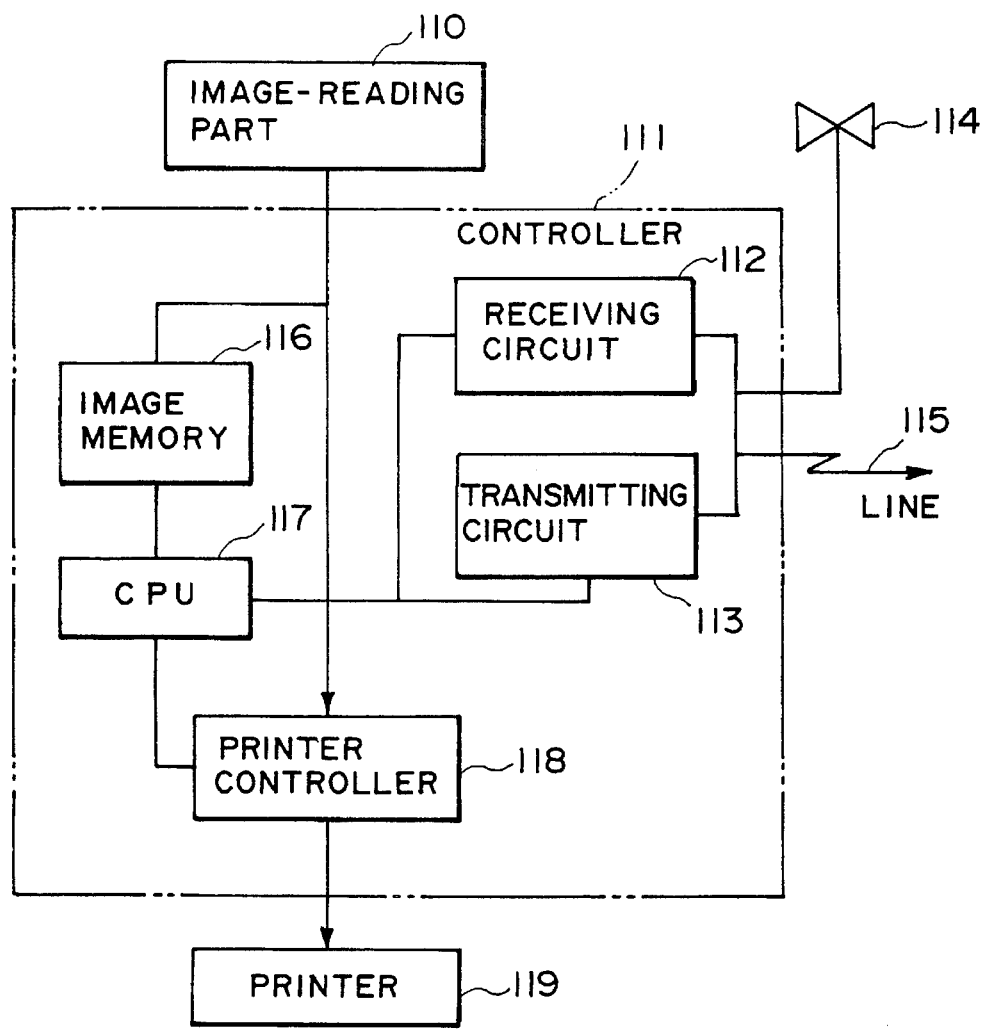
FIG. 5 is a block diagram of a facsimile machine using an electrophotographic apparatus according to the present invention as a printer.

In a case where the electrophotographic apparatus according to the present invention is used as a printer of a facsimile machine, light-image exposure L is used as exposure for printing received data. FIG. 5 shows a block diagram of an embodiment for explaining this case. Referring to FIG. 5, a controller 111 controls an image-reading part 110 and a printer 119. The whole controller 111 is controlled by a CPU (central processing unit) 117. Read data from the image-reading part is transmitted to a partner station through a transmitting circuit 113, and on the other hand, the received data from the partner station is sent to the printer 119 through a receiving circuit 112. An image memory 116 memorizes prescribed image data. A printer controller 118 controls the printer 119, and a reference numeral 114 denotes a telephone handset.

The image received through a line or circuit 115 (the image data sent through the line from a connected remote terminal) is demodulated by means of the receiving circuit 112 and successively stored in an image memory 116 after a restoring-signal processing of the image data. When image for at least one page is stored in the image memory 116, image recording of the page is effected. The CPU 117 reads out the image data for one page from the image memory 116 and sends the image data for one page subjected to the restoring-signal processing to the printer controller 118. The printer controller 118 receives the image data for one page from the CPU 117 and controls the printer 119 in order to effect image-data recording. Further, the CPU 117 is caused to receive image for a subsequent page during the recording by the printer 119. As described above, the receiving and recording of the image are performed.

Hereinbelow, the present invention will be explained more specifically with reference to examples.

EXAMPLE 1

181.2 g of a polyester-based diol (molecular weight= 1000, hydroxyl value=112.22 (mgKOH/g)) obtained from adipic acid and 1,4-butylene glycol (1,4-BG), and 100 g of diphenylmethane-4,4'-diisocynate (MDI) were reacted with each other for 2 hours at 80° C. under nitrogen atmosphere to prepare a polyester-based urethane prepolymer having a free isocyanate content (NCO %) of 6.5%.

Then, 100 g of the polyester-based urethane prepolymer was mixed with a hardener composition comprising 4.07 g of 1,4-butylene glycol (1,4-BG) and 2.19 g of 1,1,1-trimethylolpropane (TMP) (65:35 by weight), followed by stirring, defoaming, and heating for 3 hours at 130° C. to prepare a polyurethane elastomer.

The thus prepared polyurethane elastomer was subjected to evaluation of some performances required for a cleaning blade.

The results are shown in Table 1 below together with formulation and some properties.

Herein, the performances of a polyurethane elastomer were evaluated as follows.

Durability

A cleaning blade was incorporated in a laser beam printer "Laser Jet III Si", (manufactured: by Hewlett-Packard Co.) and subjected to a successive copying test of 5000 sheets under normal temperature—normal humidity condition.

o: No problem x: Not acceptable (e.g., the cleaning blade was partly broken and thus black lengthwise (or vertical) streaks on a resultant image were caused to occur).

Creep characteristics (Creep resistance)

As shown in FIG. 1, a test piece of a polyurethane elastomer 1 (length=20 mm, width=10 mm, thickness=2 mm) was prepared and fixed by a fixture (or fixing member) 2 so as to provide an angle of 25 degrees formed by the indicated center line of the polyurethane elastomer 1 and an extended line of the surface of a pressing plate 3. The pressing plate 3 was moved approached toward the test piece (polyurethane elastomer) from a sufficiently distant position and was placed in contact with a corner of the test piece without deforming the test piece. At this time, a value of a scale of a micrometer 4 was read (value=a).

Then, as shown in FIG. 2, the pressing plate 3 was further moved by 1.5 mm in the upward direction (i.e., the direction perpendicular to the surface of the pressing plate 3) from the position shown in FIG. 1. At this time, a value of the scale of the micrometer 4 was read (value=b). The test piece was left standing for 5 days at 45° C. in this state and further left standing for 5 hours at room temperature. Then, the pressing plate 3 was moved by more than 1.5 mm in reverse direction so as not to be in contact with the test piece and was left standing for 1 hour.

Thereafter, the pressing plate 3 was again moved toward the test piece and was placed in contact with a corner of the test piece without deforming the test piece as shown in FIG. 3. At this time, a value of the scale of the micrometer 4 was read (value=c).

A deformation degree δ (%) was obtained from the following equation:

$$\delta(\%) = 100 \times (c-a)/(b-a).$$

o: δ was at most 10%.

x: 6₂ was above 10%.

Low-temperature cleaning property

A cleaning blade having a prescribed size was prepared and sufficiently left standing (24 hours) at 12° C. Thereafter, the cleaning blade was subjected to a cleaning test.

o: No problem x: Cleaning failure occurred (e.g., an elasticity of the cleaning blade was decreased and the passage of toner particles was caused to occur, thus resulting in black breathwise or lateral streaks on a resultant image).

Overall evaluation o: All of the above items were good.

x: At least one of the above items was not good.

EXAMPLES 2–23 AND COMPARATIVE EXAMPLES 1–58

Cleaning blades were prepared by using polyurethane elastomers each formed in the same manner as in Example 1 except for using components including ethylene glycol (EG) shown in Tables 1 and 2. Each of the cleaning blades was evaluated in the same manner as in Example 1. The results are also shown in Tables 1 and 2.

TABLE 1

| Ex. No. | Polyester diol | | | | NCO % in prepolymer | 1,4-BG (g) per 100 g of prepolymer | TMP(g) per 100 g of prepolymer | Urethane group concentration (mM/g) | TMP concentration (mM/g) | tan δ peak temp. (°C.) | Evaluation | | | |
|---|---|---|---|---|---|---|---|---|---|---|---|---|---|---|
| | Molar ratio of EG:1,4-BG | Molecular weight | Hydroxyl value (mgKOH/g) | Amount (g) per 100 g of MDI | | | | | | | *1 | *2 | *3 | *4 |
| 1 | 0.00:1.00 | 1000 | 112.22 | 181.20 | 6.5 | 4.07 | 2.19 | 2.52 | 0.15 | 10.1 | o | o | o | o |
| 2 | 0.00:1.00 | 1000 | 112.22 | 224.80 | 4.5 | 2.82 | 1.52 | 2.25 | 0.11 | 0.5 | o | o | o | o |
| 3 | 0.00:1.00 | 1500 | 74.81 | 210.31 | 7.0 | 4.38 | 2.36 | 2.25 | 0.16 | 4.0 | o | o | o | o |
| 4 | 0.00:1.00 | 1500 | 74.81 | 177.30 | 8.5 | 5.32 | 2.86 | 2.47 | 0.20 | 11.5 | o | o | o | o |
| 5 | 0.00:1.00 | 2000 | 56.11 | 209.01 | 8.0 | 5.01 | 2.70 | 2.22 | 0.19 | 3.3 | o | o | o | o |
| 6 | 0.00:1.00 | 2000 | 56.11 | 175.18 | 9.5 | 5.94 | 3.20 | 2.45 | 0.22 | 11.0 | o | o | o | o |
| 7 | 0.25:0.75 | 1000 | 112.22 | 224.80 | 4.5 | 2.82 | 1.52 | 2.25 | 0.11 | 2.9 | o | o | o | o |
| 8 | 0.25:0.75 | 1000 | 112.22 | 190.97 | 6.0 | 3.75 | 2.02 | 2.46 | 0.14 | 10.2 | o | o | o | o |
| 9 | 0.25:0.75 | 1500 | 74.81 | 210.31 | 7.0 | 4.38 | 2.36 | 2.25 | 0.16 | 6.5 | o | o | o | o |
| 10 | 0.25:0.75 | 1500 | 74.81 | 187.49 | 8.0 | 5.01 | 2.70 | 2.40 | 0.19 | 11.6 | o | o | o | o |
| 11 | 0.25:0.75 | 2000 | 56.11 | 209.01 | 8.0 | 5.01 | 2.70 | 2.22 | 0.19 | 5.8 | o | o | o | o |
| 12 | 0.25:0.75 | 2000 | 56.11 | 185.60 | 9.0 | 5.63 | 3.03 | 2.37 | 0.21 | 11.0 | o | o | o | o |
| 13 | 0.50:0.50 | 1000 | 112.22 | 224.80 | 4.5 | 2.82 | 1.52 | 2.25 | 0.11 | 5.3 | o | o | o | o |
| 14 | 0.50:0.50 | 1000 | 112.22 | 201.43 | 5.5 | 3.44 | 1.85 | 2.39 | 0.13 | 10.2 | o | o | o | o |
| 15 | 0.50:0.50 | 1500 | 74.81 | 210.31 | 7.0 | 4.38 | 2.36 | 2.25 | 0.16 | 8.9 | o | o | o | o |
| 16 | 0.50:0.50 | 1500 | 74.81 | 198.47 | 7.5 | 4.69 | 2.53 | 2.33 | 0.18 | 11.5 | o | o | o | o |
| 17 | 0.50:0.50 | 2000 | 56.11 | 209.01 | 8.0 | 5.01 | 2.70 | 2.22 | 0.19 | 8.3 | o | o | o | o |
| 18 | 0.50:0.50 | 2000 | 56.11 | 196.84 | 8.5 | 5.32 | 2.86 | 2.30 | 0.20 | 10.9 | o | o | o | o |
| 19 | 0.75:0.25 | 1000 | 112.22 | 224.80 | 4.5 | 2.82 | 1.52 | 2.25 | 0.11 | 7.5 | o | o | o | o |
| 20 | 0.75:0.25 | 1000 | 112.22 | 212.68 | 5.0 | 3.13 | 1.68 | 2.32 | 0.12 | 10.0 | o | o | o | o |
| 21 | 0.75:0.25 | 1500 | 74.81 | 210.31 | 7.0 | 4.38 | 2.36 | 2.25 | 0.16 | 11.2 | o | o | o | o |
| 22 | 0.75:0.25 | 2000 | 56.11 | 209.01 | 8.0 | 5.01 | 2.70 | 2.22 | 0.19 | 10.7 | o | o | o | o |
| 23 | 1.00:0.00 | 1000 | 112.22 | 224.80 | 4.5 | 2.82 | 1.52 | 2.25 | 0.11 | 9.6 | o | o | o | o |

*1: Durability; *2: Creep characteristics, *3: Low-temperature cleaning property, *4: Overall evaluation

TABLE 2

| Comp. Ex. No. | Polyester diol | | | | NCO % in pre-polymer | 1,4-BG (g) per 100 g of pre-polymer | TMP(g) per 100 g of pre-polymer | Urethane group concentration (mM/g) | TMP concentration (mM/g) | tan δ peak temp. (°C.) | Evaluation | | | |
|---|---|---|---|---|---|---|---|---|---|---|---|---|---|---|
| | Molar ratio of EG:1,4-BG | Molecular weight | Hydroxyl value (mgKOH/g) | Amount (g) per 100 g of MDI | | | | | | | *1 | *2 | *3 | *4 |
| 1 | 0.00:1.00 | 1000 | 112.22 | 237.90 | 4.0 | 2.50 | 1.35 | 2.18 | 0.10 | −1.9 | x | x | o | x |
| 2 | 0.00:1.00 | 1000 | 112.22 | 172.07 | 7.0 | 4.38 | 2.36 | 2.59 | 0.16 | 12.5 | o | o | x | x |
| 3 | 0.00:1.00 | 1500 | 74.81 | 414.46 | 2.0 | 1.25 | 0.67 | 1.47 | 0.05 | −21.6 | x | x | o | x |
| 4 | 0.00:1.00 | 1500 | 74.81 | 382.71 | 2.5 | 1.56 | 0.84 | 1.56 | 0.06 | −19.0 | x | x | o | x |
| 5 | 0.00:1.00 | 1500 | 74.81 | 223.13 | 6.5 | 4.07 | 2.19 | 2.18 | 0.15 | 1.4 | x | o | o | x |
| 6 | 0.00:1.00 | 1500 | 74.81 | 167.80 | 9.0 | 5.63 | 3.03 | 2.54 | 0.21 | 14.0 | o | o | x | x |
| 7 | 0.00:1.00 | 2000 | 56.11 | 389.60 | 3.5 | 2.19 | 1.18 | 1.50 | 0.09 | −20.3 | x | x | o | x |
| 8 | 0.00:1.00 | 2000 | 56.11 | 359.75 | 4.0 | 2.50 | 1.35 | 1.58 | 0.10 | −17.7 | x | x | o | x |
| 9 | 0.00:1.00 | 2000 | 56.11 | 222.22 | 7.5 | 4.69 | 2.53 | 2.14 | 0.18 | 0.7 | x | o | o | x |
| 10 | 0.00:1.00 | 2000 | 56.11 | 165.49 | 10.0 | 6.26 | 3.37 | 2.52 | 0.23 | 13.6 | o | o | x | x |
| 11 | 0.25:0.75 | 1000 | 112.22 | 237.90 | 4.0 | 2.50 | 1.35 | 2.18 | 0.10 | 0.5 | x | x | o | x |
| 12 | 0.25:0.75 | 1000 | 112.22 | 181.20 | 6.5 | 4.07 | 2.19 | 2.52 | 0.15 | 12.6 | o | o | x | x |
| 13 | 0.25:0.75 | 1500 | 74.81 | 354.64 | 3.0 | 1.88 | 1.01 | 1.64 | 0.07 | −14.1 | x | x | o | x |
| 14 | 0.25:0.75 | 1500 | 74.81 | 329.66 | 3.5 | 2.19 | 1.18 | 1.71 | 0.09 | −11.5 | x | x | o | x |
| 15 | 0.25:0.75 | 1500 | 74.81 | 223.19 | 6.5 | 4.07 | 2.19 | 2.18 | 0.15 | 3.9 | x | o | o | x |
| 16 | 0.25:0.75 | 1500 | 74.81 | 177.30 | 8.5 | 5.32 | 2.86 | 2.47 | 0.20 | 14.1 | o | o | x | x |
| 17 | 0.25:0.75 | 2000 | 56.11 | 333.32 | 4.5 | 2.82 | 1.52 | 1.66 | 0.11 | −12.7 | x | o | o | x |
| 18 | 0.25:0.75 | 2000 | 56.11 | 309.77 | 5.0 | 3.13 | 1.68 | 1.74 | 0.12 | −10.0 | x | o | o | x |
| 19 | 0.25:0.75 | 2000 | 56.11 | 222.22 | 7.5 | 4.69 | 2.53 | 2.14 | 0.18 | 3.2 | x | o | o | x |
| 20 | 0.25:0.75 | 2000 | 56.11 | 175.18 | 9.5 | 5.94 | 3.20 | 2.45 | 0.22 | 13.7 | o | o | x | x |
| 21 | 0.50:0.50 | 1000 | 112.22 | 302.88 | 2.0 | 1.25 | 0.67 | 1.90 | 0.05 | −7.1 | x | x | o | x |
| 22 | 0.50:0.50 | 1000 | 112.22 | 284.40 | 2.5 | 1.56 | 0.84 | 1.97 | 0.06 | −4.6 | x | x | o | x |
| 23 | 0.50:0.50 | 1000 | 112.22 | 237.90 | 4.0 | 2.50 | 1.35 | 2.18 | 0.10 | 2.8 | x | x | o | x |
| 24 | 0.50:0.50 | 1000 | 112.22 | 190.97 | 6.0 | 3.75 | 2.02 | 2.46 | 0.14 | 12.6 | o | o | x | x |
| 25 | 0.50:0.50 | 1500 | 74.81 | 307.28 | 4.0 | 2.50 | 1.35 | 1.79 | 0.10 | −6.7 | x | x | o | x |
| 26 | 0.50:0.50 | 1500 | 74.81 | 287.12 | 4.5 | 2.82 | 1.52 | 1.87 | 0.11 | −4.1 | x | o | o | x |
| 27 | 0.50:0.50 | 1500 | 74.81 | 223.13 | 6.5 | 4.07 | 2.19 | 2.18 | 0.15 | 6.3 | x | o | o | x |
| 28 | 0.50:0.50 | 1500 | 74.81 | 187.49 | 8.0 | 5.01 | 2.70 | 2.40 | 0.19 | 14.1 | o | o | x | x |
| 29 | 0.50:0.50 | 2000 | 56.11 | 288.65 | 5.5 | 3.44 | 1.85 | 1.82 | 0.13 | −5.0 | x | o | o | x |
| 30 | 0.50:0.50 | 2000 | 56.11 | 269.60 | 6.0 | 3.75 | 2.02 | 1.90 | 0.14 | −2.4 | x | o | o | x |
| 31 | 0.50:0.50 | 2000 | 56.11 | 222.22 | 7.5 | 4.69 | 2.53 | 2.14 | 0.18 | 5.6 | x | o | o | x |
| 32 | 0.50:0.50 | 2000 | 56.11 | 185.60 | 9.0 | 5.63 | 3.03 | 2.37 | 0.21 | 13.6 | o | o | x | x |
| 33 | 0.75:0.25 | 1000 | 112.22 | 267.54 | 3.0 | 1.88 | 1.01 | 2.04 | 0.07 | 0.0 | x | x | o | x |
| 34 | 0.75:0.25 | 1000 | 112.22 | 252.09 | 3.5 | 2.19 | 1.18 | 2.11 | 0.09 | 2.5 | x | x | o | x |
| 35 | 0.75:0.25 | 1000 | 112.22 | 237.90 | 4.0 | 2.50 | 1.35 | 2.18 | 0.10 | 5.0 | x | x | o | x |
| 36 | 0.75:0.25 | 1000 | 112.22 | 201.43 | 5.5 | 3.44 | 1.85 | 2.39 | 0.13 | 12.5 | o | o | x | x |
| 37 | 0.75:0.25 | 1500 | 74.81 | 268.86 | 5.0 | 3.13 | 1.68 | 1.95 | 0.12 | 0.7 | x | o | o | x |
| 38 | 0.75:0.25 | 1500 | 74.81 | 252.25 | 5.5 | 3.44 | 1.85 | 2.03 | 0.13 | 3.4 | x | o | o | x |
| 39 | 0.75:0.25 | 1500 | 74.81 | 223.13 | 6.5 | 4.07 | 2.19 | 2.18 | 0.15 | 8.6 | x | o | o | x |
| 40 | 0.75:0.25 | 1500 | 74.81 | 198.47 | 7.5 | 4.69 | 2.53 | 2.33 | 0.18 | 13.9 | o | o | x | x |
| 41 | 0.75:0.25 | 2000 | 56.11 | 269.60 | 6.0 | 3.75 | 2.02 | 1.90 | 0.14 | −0.1 | x | o | o | x |
| 42 | 0.75:0.25 | 2000 | 56.11 | 252.33 | 6.5 | 4.07 | 2.19 | 1.98 | 0.15 | 2.6 | x | o | o | x |
| 43 | 0.75:0.25 | 2000 | 56.11 | 222.22 | 7.5 | 4.69 | 2.53 | 2.14 | 0.18 | 8.0 | x | o | o | x |
| 44 | 0.75:0.25 | 2000 | 56.11 | 196.84 | 8.5 | 5.32 | 2.86 | 2.30 | 0.20 | 13.3 | o | o | x | x |
| 45 | 1.00:0.00 | 1000 | 112.22 | 237.90 | 4.0 | 2.50 | 1.35 | 2.18 | 0.10 | 7.1 | x | x | o | x |
| 46 | 1.00:0.00 | 1000 | 112.22 | 212.68 | 5.8 | 3.13 | 1.68 | 2.32 | 0.12 | 12.1 | o | o | x | x |
| 47 | 1.00:0.00 | 1500 | 74.81 | 237.06 | 6.0 | 3.75 | 2.02 | 2.10 | 0.14 | 8.2 | x | o | o | x |
| 48 | 1.00:0.00 | 1500 | 74.81 | 223.13 | 6.5 | 4.07 | 2.19 | 2.18 | 0.15 | 10.8 | x | o | o | x |
| 49 | 1.00:0.00 | 1500 | 74.81 | 210.31 | 7.0 | 4.38 | 2.36 | 2.25 | 0.16 | 13.5 | o | o | x | x |
| 50 | 1.00:0.00 | 2000 | 56.11 | 236.60 | 7.0 | 4.38 | 2.36 | 2.06 | 0.16 | 7.5 | x | o | o | x |
| 51 | 1.00:0.00 | 2000 | 56.11 | 222.22 | 7.5 | 4.69 | 2.53 | 2.14 | 0.18 | 10.2 | x | o | o | x |
| 52 | 1.00:0.00 | 2000 | 56.11 | 209.01 | 8.0 | 5.01 | 2.70 | 2.22 | 0.19 | 12.9 | o | o | x | x |

As described hereinabove, according to the present application by increasing a TMP concentration (at least 0.10 mM/g) of a hardener composition within a polyurethane elastomer in order to increase a crosslink density of the elastomer and by increasing a urethane group concentration (at least 2.20 mM/g) within the elastomer in order to prevent a decrease in hardness (or mechanical strength) and to improve an abrasion resistance and further by providing a tanδ peak temperature (at most 12° C.) in order to retain an appropriate elasticity and hardness, it is possible to provide a cleaning blade excellent in a creep resistance, a durability after repetitive use for a long period or a long pause (or quiescent) period, and a cleaning function at a lower temperature, respectively.

What is claimed is:

1. A cleaning blade, comprising: a polyurethane elastomer obtained by using a hardener composition comprising at least trimethylolpropane, wherein said polyurethane elastomer has the following properties (1) to (3):

(1) a trimethylolpropane concentration of at least 0.10 mM/g;

(2) a urethane group concentration of at least 2.20 mM/g; and (3) a tanδ having a maximum value at a temperature of at most 12° C.

2. A blade according to claim 1, wherein said polyurethane elastomer has a trimethylolpropane concentration of 0.11–0.22 mM/g.

3. A blade according to claim 1, wherein said polyurethane elastomer has an urethane group concentration of 2.22–2.52 mM/g.

4. A blade according to claim 1, wherein said polyurethane elastomer has a tanδ having a maximum value at a temperature of 0.5°–11.6° C.

5. A blade according to claim 1, wherein said polyurethane elastomer has a trimethylolpropane concentration of at least 0.11 mM/g, an urethane group concentration of at least 2.22 mM/g, and a tanδ having a maximum value at a temperature of at most 11.6° C.

6. A blade according to any one of claims 1–5, wherein said polyurethane elastomer is obtained by reacting a prepolymer, which is obtained by reacting a diisocynate with a polyester diol obtained from a dicarboxylic acid and a diol, with a hardener composition comprising at least trimethylolpropane.

7. A blade according to claim 6, wherein said dicarboxylic acid is adipic acid; said diol is either one or both of ethylene glycol and butylene glycol; said diisocynate is diphenylmethane-4,4'-diisocynate; and said hardener composition comprises trimethylolpropane and 1,4-butylene glycol.

8. A blade according to claim 1, which is used in electrophotography.

9. A blade according to claim 8, wherein said polyurethane elastomer has a trimethylolpropane concentration of at least 0.11 mM/g, an urethane group concentration of at least 2.22 mM/g, and a tanδ having a maximum value at a temperature of at most 11.6° C.

10. A blade according to claim 8 or 9, wherein said polyurethane elastomer is obtained by reacting a prepolymer, which is obtained by reacting a diisocynate with a polyester diol obtained from a dicarboxylic acid and a diol, with a hardener composition comprising at least trimethylolpropane.

11. A blade according to claim 10, wherein said dicarboxylic acid is adipic acid; said diol is either one or both of ethylene glycol and butylene glycol; said diisocynate is diphenylmethane-4,4'-diisocynate; and said hardener composition comprises trimethylolpropane and 1,4-butylene glycol.

12. A process cartridge, comprising:
a cleaning blade, comprising a polyurethane elastomer obtained by using a hardener composition comprising at least trimethylolpropane, wherein said polyurethane elastomer has the following properties (1) to (3):
(1) a trimethylolpropane concentration of at least 0.10 mM/g;
(2) a urethane group concentration of at least 2.20 mM/g: and
(3) a tanδ having a maximum value at a temperature of at most 12° C.; and an electrophotographic photosensitive member integrally supported to form a single cartridge which can be connected to or released from an apparatus body of an image-forming apparatus as desired.

13. A cartridge according to claim 12, wherein said polyurethane elastomer has a trimethylolpropane concentration of at least 0.11 mM/g, an urethane group concentration of at least 2.22 mM/g, and a tanδ having a maximum value at a temperature of at most 11.6° C.

14. A cartridge according to claim 12 or 13, wherein said polyurethane elastomer is obtained by reacting a prepolymer, which is obtained by reacting a diisocynate with a polyester diol obtained from a dicarboxylic acid and a diol, with a hardener composition comprising at least trimethylolpropane.

15. A cartridge according to claim 14, wherein said dicarboxylic acid is adipic acid; said diol is either one or both of ethylene glycol and butylene glycol; said diisocynate is diphenylmethane-4,4'-diisocynate; and said hardener composition comprises trimethylolpropane and 1,4-butylene glycol.

16. An electrophotographic apparatus comprising:
an electrophotographic photosensitive member;
means for forming an electrostatic latent image;
means for developing the formed electrostatic latent image;
means for transferring the developed image to a transfer-receiving material; and
a cleaning blade comprising a polyurethane elastomer obtained by using a hardener composition comprising at least trimethylolpropane, wherein said polyurethane elastomer has the following properties (1) to (3):
(1) a trimethylolpropane concentration of at least 0.10 mM/g; and
(2) a urethane group concentration of at least 2.20 mM/g; and
(3) a tanδ having a maximum value at a temperature of at most 12° C.

17. An apparatus according to claim 16, wherein said polyurethane elastomer has a trimethylolpropane concentration of at least 0.11 mM/g, an urethane group concentration of at least 2.22 mM/g, and a tanδ having a maximum value at a temperature of at most 11.6° C.

18. An apparatus according to claim 16 or 17, wherein said polyurethane elastomer is obtained by reacting a prepolymer, which is obtained by reacting a diisocynate with a polyester diol obtained from a dicarboxylic acid and a diol, with a hardener composition comprising at least trimethylolpropane.

19. An apparatus according to claim 18, wherein said dicarboxylic acid is adipic acid; said diol is either one or both of ethylene glycol and butylene glycol; said diisocynate is diphenylmethane-4,4'-diisocynate; and said hardener composition comprises trimethylolpropane and 1,4-butylene glycol.

* * * * *

UNITED STATES PATENT AND TRADEMARK OFFICE
CERTIFICATE OF CORRECTION

PATENT NO. : 5,510,887  
DATED : April 23, 1996  
INVENTOR(S) : MASAHIRO WATABE, et al.

Page 1 of 3

It is certified that error appears in the above-indentified patent and that said Letters Patent is hereby corrected as shown below:

COLUMN 1

Line 56, "have" should read --has--.

COLUMN 3

Line 13, "an" should read --a--.  
Line 55, "mili-moles" should read --millimoles--.

COLUMN 4

Line 4, "milimoles" should read --millimoles--.  
Line 64, "diisocynate" should read --diisocyanate--.

COLUMN 5

Line 21, "another" should read --other--.

COLUMN 6

Line 9, "comprises" should read --comprise--.  
Line 58, "diisocynate" should read --diisocyanate--.

COLUMN 7

Line 10, "(manufactured:" should read --(manufactured--.  
Line 24, "approached" should be deleted.

UNITED STATES PATENT AND TRADEMARK OFFICE
CERTIFICATE OF CORRECTION

PATENT NO. : 5,510,887     Page 2 of 3

DATED : April 23, 1996

INVENTOR(S) : MASAHIRO WATABE, et al.

It is certified that error appears in the above-indentified patent and that said Letters Patent is hereby corrected as shown below:

COLUMN 8

Line 7, "degree 6" should read --degree $\delta$--.
Line 13, "62" should read --$\delta$--.

COLUMN 11

Line 2, "an" should read --a--.
Line 9, "an" should read --a--.
Line 14, "diisocynate" should read --diisocyanate--.
Line 20, "diisocynate" should read --diisocyanate--.
Line 21, "diisocynate;" should read --diisocyante;--.
Line 27, "an" should read --a--.
Line 32, "diicocynate" should read --diisocyanate--.
Line 38, "diicocynate" should read --diisocyanate--.
Line 39, "diisocynate;" should read --diisocyanate;--.
Line 49, "mM/g:" should read --mM/g;--.

UNITED STATES PATENT AND TRADEMARK OFFICE
CERTIFICATE OF CORRECTION

PATENT NO. : 5,510,887
DATED : April 23, 1996
INVENTOR(S) : MASAHIRO WATABE, et al.

It is certified that error appears in the above-indentified patent and that said Letters Patent is hereby corrected as shown below:

COLUMN 12

Line 3, "an" should read --a--.
Line 8, "diisocynate" should read --diisocyanate--.
Line 14, "diisocynate" should read --diisocyanate--.
Line 15, "diisocynate;" should read --diisocyanate;--.
Line 32, "and" should be deleted.
Line 39, "an" should read --a--.
Line 44, "diisocynate" should read --diisocyanate--.
Line 50, "diisocynate" should read --diisocyanate--.
Line 51, "diisocynate;" should read --diisocyanate;--.

Signed and Sealed this

Nineteenth Day of November, 1996

Attest:

BRUCE LEHMAN

Attesting Officer

Commissioner of Patents and Trademarks